US012586420B2

(12) United States Patent
Gerasimov et al.

(10) Patent No.: US 12,586,420 B2
(45) Date of Patent: Mar. 24, 2026

(54) CASCADE ENSEMBLES FOR LIVENESS DETECTION

(71) Applicant: UNICOTECH PORTUGAL, UNIPESSOAL LDA, Lisbon (PT)

(72) Inventors: Artem Gerasimov, Dubai (AE); Yury Litvinov, Almaty (KZ); Ivan Kryachko, Almaty (KZ); Bakai Zhamgyrchiev, Almaty (KZ); Svetlana Efimova, Dubai (AE)

(73) Assignee: UNICOTECH PORTUGAL, UNIPESSOAL LDA, Lisbon (PT)

( * ) Notice: Subject to any disclaimer, the term of this patent is extended or adjusted under 35 U.S.C. 154(b) by 243 days.

(21) Appl. No.: 18/360,100

(22) Filed: Jul. 27, 2023

(65) Prior Publication Data

US 2025/0037508 A1       Jan. 30, 2025

(51) Int. Cl.
*G06V 40/40* (2022.01)
*G06F 21/32* (2013.01)
(52) U.S. Cl.
CPC .............. *G06V 40/45* (2022.01); *G06F 21/32* (2013.01)
(58) Field of Classification Search
None
See application file for complete search history.

(56) References Cited

U.S. PATENT DOCUMENTS

| | | | |
|---|---|---|---|
| 8,965,044 B1 * | 2/2015 | Owechko ............. | G06V 10/771 382/104 |
| 10,061,996 B1 * | 8/2018 | Chow .................. | G06V 40/171 |
| 10,803,301 B1 * | 10/2020 | Farivar .................. | G06N 3/045 |
| 2020/0175290 A1 | 6/2020 | Raja et al. | |

FOREIGN PATENT DOCUMENTS

| | | |
|---|---|---|
| CN | 111860268 A | 10/2020 |
| CN | 114092994 A | 2/2022 |

* cited by examiner

*Primary Examiner* — Helen Zong
(74) *Attorney, Agent, or Firm* — ESPE Legal Consultancy FZ-LLC

(57) ABSTRACT

Systems and methods for performing liveness detection. A method includes transmitting an image or a video by a threat detector to one or more filters for a first level check for detecting a threat based on analysis of certain characteristics, transmitting the image or the video to one or more special models for a second level check, wherein the one or more special models are configured for detecting multiple types of threats on the image or the video, transmitting the image or the video to a general model ensemble for a third level check to classify the image or the video according to individual features into original and fake, and in response to detecting the threat, registering the threat by the threat detector.

20 Claims, 4 Drawing Sheets

100

100

300

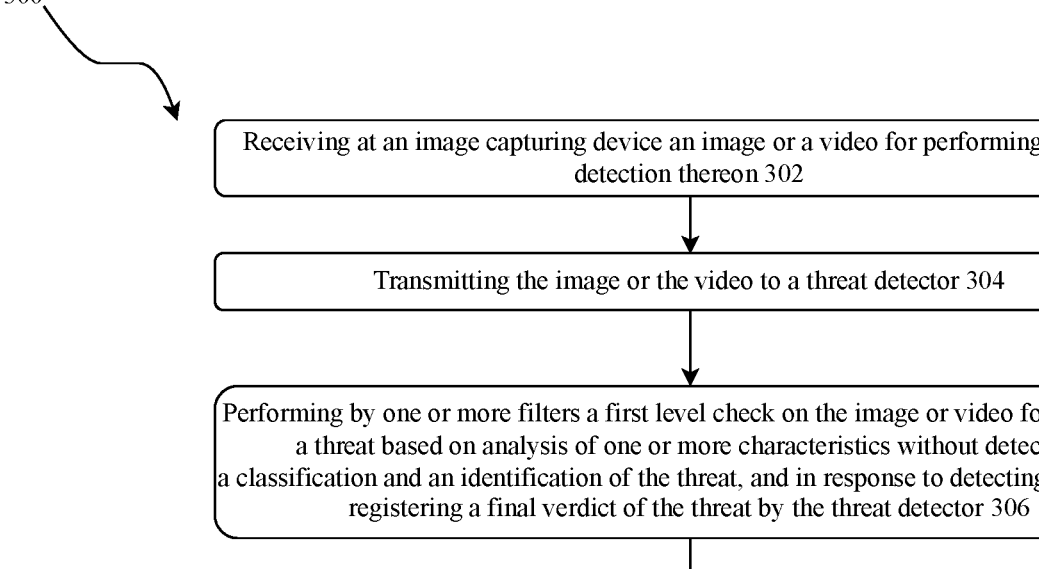

Receiving at an image capturing device an image or a video for performing liveness detection thereon 302

Transmitting the image or the video to a threat detector 304

Performing by one or more filters a first level check on the image or video for detecting a threat based on analysis of one or more characteristics without detecting a classification and an identification of the threat, and in response to detecting the threat, registering a final verdict of the threat by the threat detector 306

If the threat is not detected in the first level check, performing by one or more special models a second level check on the image or the video, wherein the one or more special models are configured for detecting multiple types of threats on the image or the video, wherein each special model is trained to detect a predefined type of a threat, and in response to detecting the threat, registering the final verdict of the threat by the threat detector 308

If the threat is not detected in the second level check, performing by a general model ensemble a third level check on the image or the video, wherein the general model ensemble includes multiple general threat detection models configured to classify the image or the video according to individual features into original and fake, wherein each general threat detection model is trained to calculate a rate of liveness, and the general model ensemble is trained to classify image or video as live or not based on verdict of each general threat detection model verdict; and in response to detecting the threat, registering the final verdict for the threat by the threat detector 310

Fig. 3

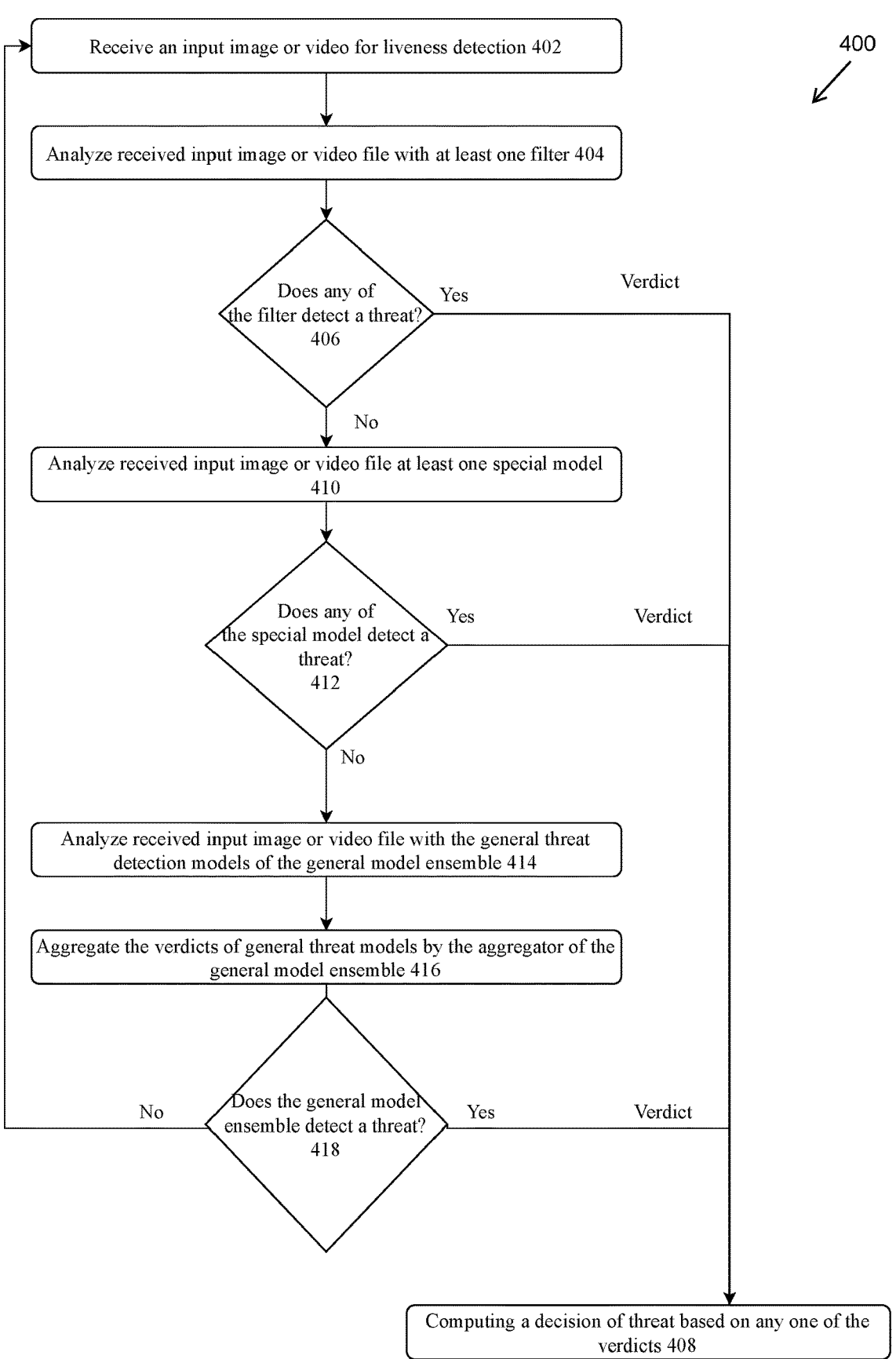

400

Receive an input image or video for liveness detection 402

Analyze received input image or video file with at least one filter 404

Does any of the filter detect a threat? 406

Yes — Verdict

No

Analyze received input image or video file at least one special model 410

Does any of the special model detect a threat? 412

Yes — Verdict

No

Analyze received input image or video file with the general threat detection models of the general model ensemble 414

Aggregate the verdicts of general threat models by the aggregator of the general model ensemble 416

Does the general model ensemble detect a threat? 418

No

Yes — Verdict

Computing a decision of threat based on any one of the verdicts 408

Fig. 4

CASCADE ENSEMBLES FOR LIVENESS DETECTION

TECHNICAL FIELD

The present disclosure generally relates to biometric authentication. In particular, the present disclosure relates to performing liveness detection.

BACKGROUND

With recent advancements in computer science, facial recognition biometric authentication is fast becoming one of the most preferred modes of authentication. Nowadays, the deployment of facial recognition as a biometric authentication method is just behind fingerprints authentication at the world level in terms of market quota. Many manufacturers are including facial recognition in their products, including smartphones, laptops, and the like. However, facial recognition is not a fool-proof authentication method. Security vulnerabilities for a typical facial recognition system include presentation attacks. In these attacks, intruders can use some type of an artificial artifact, e.g., a face photo, a mask, a synthetic fingerprint, a printed iris image, and the like, to fraudulently perform the required authentication.

The use of a monolithic threat detection model does not allow detecting all threats or attacks equally effectively, because each of the attacks can be characterized by a unique image substitution technique, which will lead to a greater error in the detection of this type of attack. At the same time, building a composition of special models for each model is inefficient as it requires support for hundreds of models, which includes training and retraining the models to maintain a satisfactory level of detection in view of the emergence of new threats. Moreover, a cascade of models tailored for a specific type of threat does not allow detection of previously unknown threats.

There is a need for liveness detection that can effectively deal with known and unknown threats, while being optimized in terms of computing resources.

SUMMARY

Embodiments described herein meet the aforementioned needs of the industry.

In an embodiment, a method for liveness detection comprises: receiving at an image capturing device an image or a video for performing liveness detection thereon; transmitting the image or the video to a threat detector; performing, by one or more filters, a first level check on the image or video for detecting a threat based on analysis of one or more characteristics without a classification or an identification of the threat, and in response to detecting the threat, registering a final verdict of the system and finalizing processing of the image or the video according to the final verdict; if the threat is not detected in the first level check, performing, by one or more special models, a second level check on the image or the video, wherein the one or more special models are configured for detecting multiple types of threats on the image or the video, wherein each special model is trained to detect a predefined type of a threat, and in response to detecting the threat, registering the final verdict of the system and finalizing processing of the image or the video according to the final verdict; if the threat is not detected in the second level check, performing, by a general model ensemble, a third level check on the image or the video, wherein the general model ensemble includes multiple general threat detection models configured to classify the image or the video according to individual features into original and fake, wherein the general model ensemble is trained to classify the image or video as live or not based on a verdict of each general threat detection model verdict; and in response to detecting the threat, registering the final verdict of the system and finalizing processing of the image or the video according to the final verdict.

In one aspect, a method further comprises sequentially determining a verdict associated with a probability of the threat by each filter from an ordered list of filters, wherein the detecting of a threat is registered by the threat detector when the probability of the threat exceeds a threshold value for at least one of the filters.

In one aspect, a method further comprises receiving a verdict associated with a probability of the threat by each special model of one or more special models, wherein the final verdict of the threat is registered by the threat detector when the probability of the threat exceeds a threshold value.

In one aspect, a method further comprises receiving, at the one or more special models, input from the one or more filters as an input parameter for detecting the threat and a type of the threat by the one or more special models.

In one aspect, a method further comprises detecting unknown threats by the general model ensemble, wherein the general model ensemble includes the general threat detection models that are trained to be uncorrelated.

In one aspect, a method further comprises generating, by each of the general threat detection models, a verdict associated with a probability of the threat, wherein the final verdict of the threat is registered by the threat detector when the probability of the threat exceeds a threshold value.

In one aspect, a method further comprises registering the final verdict based on at least one of the final verdicts from the one or more filters, the one or more special models, and the general model ensemble.

In one aspect, each general threat detection model is trained to calculate a rate of liveness.

In an embodiment, a system for liveness detection comprises an image capturing device for capturing an image or video for performing liveness detection thereon; a threat detector configured to receive the image or the video; one or more filters configured to perform a first level check for detecting a threat based on analysis of one or more characteristics on the image or the video received from the threat detector without detecting a classification or an identification of the threat, wherein on detecting the threat by the one or more filters, the threat detector registers a final threat verdict of the whole system; one or more special models configured to perform a second level check on the image or the video, wherein the one or more special models are configured for detecting multiple types of threats on the image or the video, wherein each special model is trained to detect a predefined type of a threat, wherein the verdicts of all special models is passed to an aggregator model, wherein on detecting the threat by the aggregator, the threat detector registers the final threat verdict of the whole system; a general model ensemble configured to perform a third level check on the image or the video, wherein the general model ensemble includes multiple general threat detection models configured to classify the image or the video according to individual features into original and fake, wherein the general model ensemble is trained to classify the image or video as live or not based on a verdict of each general threat detection model verdict, wherein on detecting the threat by the general model ensemble, the threat detector registers the final verdict of the whole system.

In an embodiment, a system for threat detection of an image comprises a plurality of filters configured to determine a first verdict of the image when at least one of the plurality of filters detects an attack based on a probability specific to each of the plurality of filters; a plurality of special models configured to, when the first verdict is not associated with an attack, determine a second verdict of the image when at least one of the special models detects an attack, wherein each of the plurality of special models is trained to detect a different type of threat; a general model ensemble including a plurality of threat detection models arranged in an ensemble, and configured to, when the second verdict is not associated with an attack, determine a probability of attack specific to each of the plurality of threat detection models; and an aggregator configured to aggregate each of the probabilities of attack specific to each of the plurality of threat detection models to determine a third verdict.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 3 is a flowchart of a method for performing liveness detection, in accordance with an embodiment.

FIG. 4 is a flowchart of a method for performing liveness detection, in accordance with an embodiment.

Figure 1A:
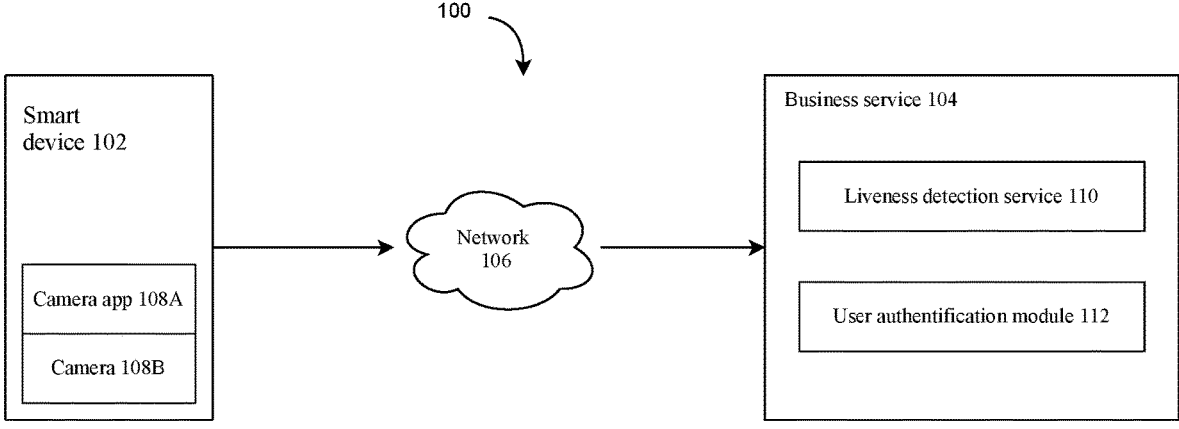
FIG. 1A and FIG. 1B are block diagrams of a working environment for systems for performing liveness detection, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The term "threat" or "attack" as used herein in the present disclosure refers to an instance for providing a false biometric sample to a biometric authentication system for the purpose of making the authentication with a fraudulent intent.

Embodiments described herein include systems and methods for performing liveness detection. In accordance with an embodiment of the present disclosure, the system is implemented as a cascaded system that is configured to perform at least three different types of security checks on the input image or video for the purpose of liveness detection. In one embodiment, the system includes a plurality of filters for performing a first level of check on the input image or video for the detecting a threat according to certain characteristics. The system further includes a plurality of special models for performing a second level of check on the input image or video for detecting the threat and classifying the threat as well. In one implementation, the plurality of special models can be configured to receive inputs from the plurality of filters to detect the threat. The system further includes a general model ensemble which includes multiple uncorrelated general threat detection models configured to perform multiple types of checks on the input image or video.

In one embodiment, the threat is registered by a threat detector when the threat is detected by any one of the plurality of filters or any one of the plurality of special models or the general model ensemble. In another embodiment, the threat detector is configured to compute a score based on the outputs of plurality of filters, the plurality of special models, and the general model ensemble, wherein the score provides an indication of the presence or absence of threat in the input image or video.

Figure 1B:
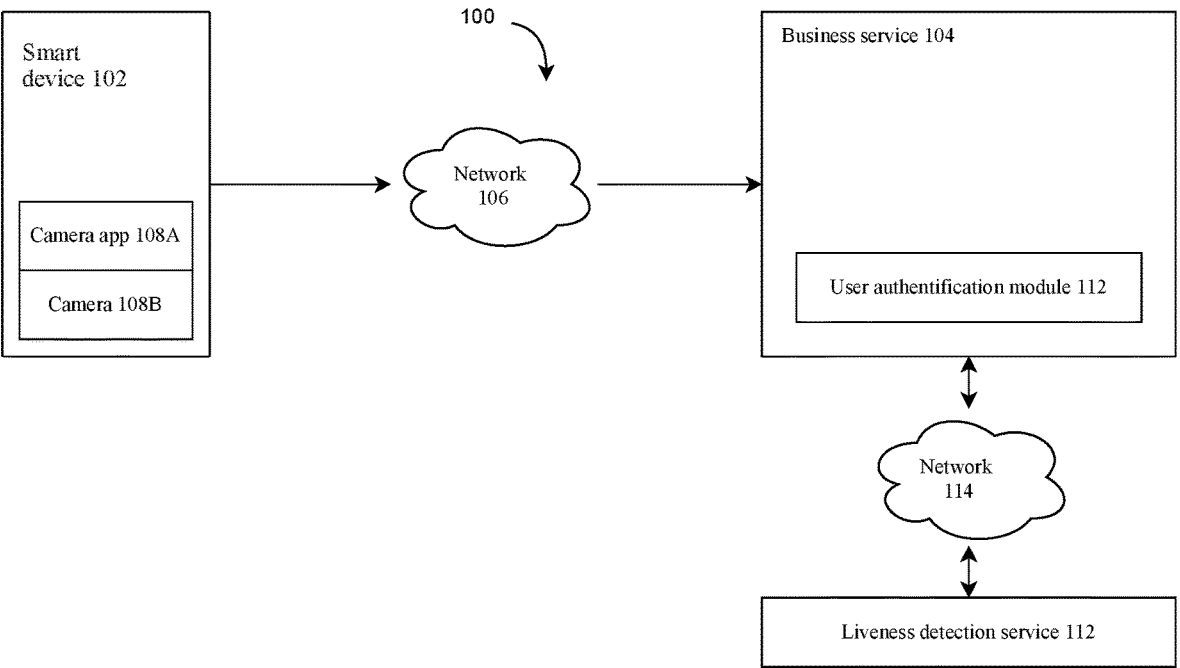

FIG. 1A and FIG. 1B are block diagrams of a working environment 100 for a system for performing liveness detection, in accordance with an embodiment. As depicted in FIG. 1A, the working environment 100 includes a smart device 102 used by a user to access a business service 104. The smart device 102 is connected to the business service 104 by a network 106. The smart device 102 includes a camera application 108A and a camera 108B for allowing the user to provide an input image or video for the purpose of biometric authentication.

The business service 104 includes a liveness detection service 110 and a user authentication module 112. The user authentication module 112 is configured to receive the input image or video for the purpose of the biometric authentication. In an embodiment, the user authentication module 112 can communicate the input image or video to the liveness detection service. Accordingly, a captured image is provided to the liveness detection service 110 to check the liveness of the imaginary data. The liveness detection service 110 is the system for performing liveness detection on the input image or video provided by the user authentication module 112. As depicted in FIG. 1A, the liveness detection service 110 can be executed at a server of the business service 104. As depicted in FIG. 1B, the liveness detection service 110 can be a remote system that is connected to the business service 104 by a network 114.

In accordance with an embodiment of the present disclosure, the liveness detection service 110 can include a cascaded system for performing liveness detection. The details of the cascaded system for performing liveness detection are described hereinafter.

Figure 2:
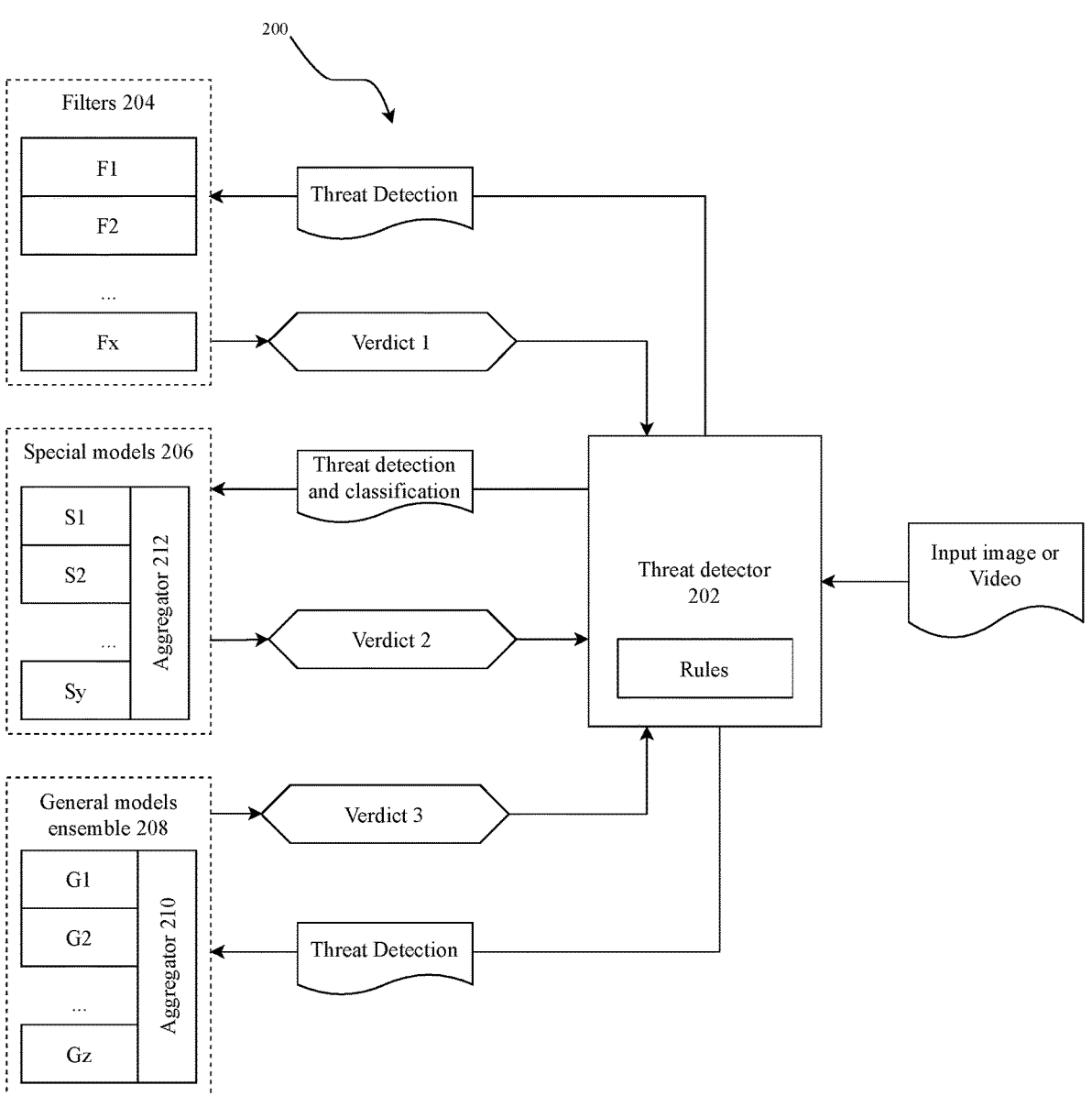
FIG. 2 is a further block diagram of a system for performing liveness detection, in accordance with an embodiment.

FIG. 2 is a block diagram of a cascaded system 200 for performing liveness detection (hereinafter interchangeably referred to as system 200), in accordance with an embodiment. The system 200 includes an image capturing device for capturing an image or video for performing liveness detection thereon, as reflected in the input image or video in FIG. 2. The image capturing device can be the camera application 108A and camera 108B of the smart device 102 associated with a user, wherein the user is trying to access the business service 104. In an embodiment, the user can access an application for the business service 104 on the smart device 102, whereafter the user is prompted to provide a biometric authentication by using the camera application 108A and camera 108B and provide an input image or video for the purpose of biometric authentication.

As mentioned previously, the business service 104 further includes the liveness detection service 110 and the user authentication module 112. The input image or video is provided by the user authentication module 112 to the liveness detection service 110, wherein the liveness detection service 110 includes the system 200 for performing liveness detection. The system 200 further includes a threat detector 202, wherein the input image or video is provided to the threat detector 202. The threat detector 202 is configured to receive the input image or the video on which liveness detection is to be performed.

As mentioned previously, the system 200 is implemented as a cascaded system that can provide multiple level security checks to the input images or videos in order to ensure that a biometric authentication attempt is not a spoofing or presentation attack. To this end, a first level security check is provided to the input image or video by one or more filters 204. The one or more filters 204 are configured to perform the first level check for detecting a threat based on an analysis of one or more characteristics of the input image or the video received from the threat detector 202. Image characteristics include picture features, metadata of the image file, environment characteristics of capturing device and/or software and derivative characteristics. For example, characteristics of the input image can be a subset of the following characteristics: brightness, contrast, white balance, color and other characteristics of the frame itself, time and date of the image acquisition, camera type, geo-location, resolution, image size, operating system version of the capturing device, device model, image storage path; image data checksums, features revealed during image encoding and decoding, features identified during the detection of objects in the image. The filters 204 are configured for detecting a threat based on certain characteristics of the input image or video. As depicted in FIG. 2, the number of filters 204 can range from F1 to Fx. In an embodiment, the filters 204 can be machine learning models for detecting a threat or an attack according to certain characteristics with low false negative rate and significant recall. In an embodiment, the filters 204 are designed to detect a threat but not to determine the type or class of the threat, because the detection by the filters 204 is based on detecting common feature patterns.

In accordance with one embodiment, if even one of the filters 204 ranging from F1 to Fx detects a threat, the threat is registered at the threat detector 202 in the form of verdict 1 (interchangeably used as first verdict hereinafter). In an embodiment, each of the filters F1 to Fx can give a verdict on the probability of a threat in the input image or video. If at least one of the filters detects an attack, i.e., a probability of detecting an attack calculated by the at least one filter exceeds a threshold value, then an attack is detected. However, this detection does not allow for accurate identification of the type of threat, in contrast to the second level security check and the third level security check, as will be described.

In one embodiment, the information of the verdict 1 of threat can be transmitted to the user authentication module 112 of the business service 104 straight away. In an embodiment, the process of receiving the verdict from the filters is a sequential process, which includes receiving the verdict associated with a probability of the threat by each filter from an ordered list of filters. The detecting of the threat is registered by the threat detector 202 when the probability of the threat exceeds a threshold value for at least one of the filters.

If a threat is not detected in first level security check, a second level security check is then performed on the input image or video by one or more special models 206. The one or more special models 206 includes a plurality of special models ranging from S1 to Sy. In an embodiment, the special models can be machine learning models for detecting a certain class of threats, wherein each special model ranging from S1 to Sy can be configured to detect a different class of threats. The special models 206 are configured to perform the second level check on the input image or the video. The one or more special models 206 are configured for detecting multiple types of threats on the image or the video, and if a threat is detected, the one or more special models 206 are configured to classify the threat as well. More specifically, if at least one of the models S1 to Sy gives a positive verdict 2 (interchangeably referred to as second verdict hereinafter), i.e., a probability of detecting a threat exceeds a threshold value, then an attack is detected. For such detection, the type of attack is determined to be corresponding to the special model, which gave the positive verdict as each special model is configured to detect a different type of threat. As such, the second level security check by the one or more models 206 includes the functions of threat detection as well as threat classification. In an alternative embodiment, for a more accurate classification of the type of threat (when several special models detect a threat at once), an additional threat classification model such as an aggregator 212 can be used that considers the verdicts of special models as input parameters. Some examples of such threat detection and threat classification can include classifying an attack as replays, 3d masks, and the like.

In an embodiment, the special models 206 can be configured to receive inputs from the one or more filters 204 for making a more thorough decision of threat detection and classification thereof. For example, the first verdict or data utilized or produced from the filters 204 in the first level security check can be utilized by the special models 206 to confirm a threat detection (or confirm no threat), and/or classify the threat, if a threat is detected.

In one embodiment, the information of the verdict 2 of threat can be transmitted to the user authentication module 112 of the business service 104 straight away.

If a threat is not detected in the second level security check, a third level security check is then performed on the input image or video by a general model ensemble 208. The general model ensemble 208 includes multiple general threat detection models G1 to Gz and an aggregator 210 configured to classify the image or the video according to individual features into original and fake. In an embodiment, the general model ensemble includes the general threat detection models G1 to Gz, which together work with an entire set of features and allow the detection of unknown threats. Each of the general threat detection models G1 to Gz outputs a certain value of the probability of detecting a threat, which are further summarized and normalized considering the weight coefficients of each model. As such, the result of the general model ensemble is a probability of detecting a threat as a whole (known, unknown and any other type). The result is compared with a threshold value and based on the comparison, a verdict 3 about the detection of the threat will be issued at the threat detector 202. In an embodiment, the general threat detection models G1 to Gz are trained in a way to ensure they are mostly uncorrelated. Since the general threat detection models are mostly uncorrelated, the input image or video is analyzed based on different characteristics by each general threat detection model. A false verdict of one model does not lead to an erroneous verdict of the second model, which is uncorrelated with the first, which allows compensating for the errors of each model.

In an embodiment, the general model ensemble 208 can be configured to receive inputs from the special models 206 for making a more thorough decision of threat detection and classification thereof. For example, the second verdict or data utilized or produced from the special models 206 in the second level security check can be utilized to confirm a threat detection (or confirm no threat), and/or classify the threat, if a threat is detected.

In an embodiment, the general model ensemble 208 can be configured to receive inputs from the one or more filters 204 for making a more thorough decision of threat detection and classification thereof. For example, the first verdict or data utilized or produced from the filters 204 in the first level security check can be utilized by the general model ensemble 208 to confirm a threat detection (or confirm no threat), and/or classify the threat, if a threat is detected.

In an embodiment, for example, for critical applications, the threat detector 202 can register a threat based on any one of the verdicts verdict 1 or verdict 2 or verdict 3. It is to be noted that verdicts 1, 2, 3 are also referred to as final verdicts in the present disclosure. In an embodiment, once the threat detector 202 computes the decision regarding threat, the same is transmitted to the user authentication module 112, which then blocks the attempt of the user to access the business service 104.

FIG. 3 is a flowchart of a method 300 for performing liveness detection (hereinafter referred to as method 300), in accordance with an embodiment. The order in which the method 300 is described is not intended to be construed as a limitation, and any number of the described method blocks can be combined in any order to implement the method or similar alternative methods. Additionally, individual blocks can be deleted from the method without departing from the spirit and scope of the subject matter described herein. Furthermore, the method can be implemented in any suitable hardware, software, firmware, or combination thereof.

At block 302, the method 300 includes receiving at an image capturing device an image or a video for performing liveness detection thereon. In an embodiment, the image capturing device can be the camera application 108A and camera 108B of the smart device 102 associated with a user, wherein the user is trying to access the business service 104. In an embodiment, the user can access an application for the business service 104 on the smart device 102, whereafter the user is prompted to provide a biometric authentication by using the camera application 108A and camera 108B and provide an input image or video for the purpose of biometric authentication.

At block 304, the method 300 includes transmitting the image or the video to a threat detector 202.

At block 306, the method 300 includes transmitting the image or the video by the threat detector to one or more filters 204 for a first level check for detecting a threat based on analysis of one or more characteristics, and in response to detecting the threat, registering a final verdict of the threat by the threat detector. In an alternative embodiment, the method 300 further comprises receiving a verdict associated with a probability of the threat by each filter of the one or more filters 204, wherein the final verdict of the threat is registered by the threat detector 202 when the probability of the threat exceeds a threshold value. In an embodiment, the process of receiving the verdict from the filters is a sequential process, which includes receiving the verdict associated with a probability of the threat by each filter from an ordered list of filters. The detecting of the threat is registered by threat detector when the probability of the threat exceeds a threshold value for at least one of the filters.

At block 308, the method 300 includes transmitting the image or the video to one or more special models for a second level check if threat is not detected in the first level check, wherein the one or more special models are configured for detecting multiple types of threats on the image or the video, and in response to detecting the threat, registering the final verdict of the threat by the threat detector. In an alternative embodiment, the method 300 further comprises receiving at the one or more special models 206 input from the one or more filters 204 as an input parameter for detecting the threat and a type of the threat. In an alternative embodiment, the method 300 further comprises receiving a verdict associated with a probability of the threat by each special model of one or more special models 206, wherein the final verdict of the threat is registered by the threat detector 202 when the probability of the threat exceeds a threshold value.

At block 310, the method 300 includes transmitting the image or the video to a general model ensemble for a third level check if threat is not detected in the second level check, wherein the general model ensemble includes multiple general threat detection models configured to classify the image or the video according to individual features into original and fake, and in response to detecting the threat, registering the final verdict for the threat by the threat detector. In an alternative embodiment, the method 300 further comprises detecting unknown threats by the general model ensemble 208, wherein the general model ensemble 208 includes general threat detection models trained in a way to ensure they are mostly uncorrelated.

In an alternative embodiment, the method 300 further comprises generating by each of the general threat detection models a verdict associated with a probability of the threat, wherein the final verdict of the threat is registered by the threat detector when the probability of the threat exceeds a threshold value.

In another embodiment, for example, for critical applications, the method 300 can include registering and providing a decision of threat by the threat detector 202 based on any one of the verdicts generated by either the one or more filters 204 or the one or more special models 206, or the general model ensemble 208.

FIG. 4 is a flowchart of a method 400 for performing liveness detection, in accordance with an embodiment.

At block 402, the method 400 includes receiving the image or video for liveness detection. In one example, the image can be taken by the camera application 108A and the camera 108B of the user's smart device 102.

At block 404, the method 400 includes analyzing the input image or video using the one or more filters 204. If a threat is detected by the one or more filters 204 at block 406, the implementation 400 includes proceeding to block 408 to register a verdict associated with the attack at the threat detector 202. For example, the verdict registered from block 406 can be the first verdict associated with the first level security check.

If the threat is not detected by the one or more filters 204, the method 400 proceeds to block 410, where the method 400 includes analyzing the input image or video using the one or more special models 206. If a threat is detected by the one or more special models 206 at block 412, the method 400 includes proceeding to block 408 to register the verdict associated with the attack at the threat detector 202. For example, the verdict registered from block 412 can be the second verdict associated with the second level security check.

If the threat is not detected by the one or more special models 206, the method 400 proceeds to block 414, where the method 400 includes analyzing the input image or video using the general threat detection models of general model ensemble 208. The verdict of the general model is a rate of liveness—a probabilistic value that characterizes the relation of an image to a particular class. For example, if the rate is 0.9 on a scale of 0 to 1, then the image will be classified as live. Rate limits, as well as threshold values that determine the relationship of an image to a certain class, are set at the model training stage and can be different. For example, if the model is trained on original images so that the class of original images is determined by the space inside a hypersphere with a radius of 1, then the rate can take values from 0 to infinity, and if it exceeds 1, then the image is considered non-original.

At block 416, the method 400 includes aggregating individual verdicts of the general threat detection models using the aggregator 210 of the general model ensemble. If a threat is detected by the general model ensemble at block 418, the implementation 400 includes proceeding to block 408 to register the verdict associated with the attack at the threat detector 202. For example, the verdict registered from block 418 can be the third verdict associated with the third level security check.

At block 408, the threat detector receives the verdict either from at least one of the one or more filters 204, the one or more special models 206, and the general model ensemble 208 to compute a decision of the threat.

An advantageous aspect of the system and method, in accordance with an embodiment of the present disclosure, is that combining three types of models, viz., filters 204, special models 206, and general model ensemble 208 into a cascade allows effective detection and classification of an attack with minimal computational costs. For example, the levels of detection can be sequentially applied in order of efficiency, from filters 204 (most efficient) to special models 206 (next-most efficient), to general model ensemble 208 (next-most efficient).

Also, another advantageous aspect of the system and the method, in accordance with the present disclosure, is that making point changes in the general image analysis pipeline is facilitated, e.g., by adding new filters and special models for new types of threats or retraining individual existing models without the need to retrain all other models, as would be the case with a conventional monolithic system or a conventional ensemble of general models.

The invention claimed is:

1. A method for liveness detection, the method comprising:

receiving at an image capturing device an image or a video for performing liveness detection thereon;

transmitting the image or the video to a threat detector;

performing, by one or more filters, a first level check on the image or video for detecting a threat based on analysis of one or more characteristics without a classification or an identification of the threat, and in response to detecting the threat, registering a final verdict of the system and finalizing processing of the image or the video according to the final verdict;

if the threat is not detected in the first level check, performing, by one or more special models, a second level check on the image or the video, wherein the one or more special models are configured for detecting multiple types of threats on the image or the video, wherein each special model is trained to detect a predefined type of a threat, and in response to detecting the threat, registering the final verdict of the system and finalizing processing of the image or the video according to the final verdict;

if the threat is not detected in the second level check, performing, by a general model ensemble, a third level check on the image or the video, wherein the general model ensemble includes multiple general threat detection models configured to classify the image or the video according to individual features into original and fake, wherein the general model ensemble is trained to classify the image or video as live or not based on a verdict of each general threat detection model verdict; and in response to detecting the threat, registering the final verdict of the system and finalizing processing of the image or the video according to the final verdict.

2. The method of claim 1, further comprising:

sequentially determining a verdict associated with a probability of the threat by each filter from an ordered list of filters, wherein the detecting of a threat is registered by the threat detector when the probability of the threat exceeds a threshold value for at least one of the filters.

3. The method of claim 2, further comprising:

receiving a verdict associated with a probability of the threat by each special model of one or more special models, wherein the final verdict of the threat is registered by the threat detector when the probability of the threat exceeds a threshold value.

4. The method of claim 3, further comprising:

receiving, at the one or more special models, input from the one or more filters as an input parameter for detecting the threat and a type of the threat by the one or more special models.

5. The method of claim 4, further comprising:

detecting unknown threats by the general model ensemble, wherein the general model ensemble includes the general threat detection models that are trained to be uncorrelated.

6. The method of claim 5, further comprising:

generating, by each of the general threat detection models, a verdict associated with a probability of the threat, wherein the final verdict of the threat is registered by the threat detector when the probability of the threat exceeds a threshold value.

7. The method of claim 1, further comprising:

registering the final verdict based on at least one of the final verdicts from the one or more filters, the one or more special models, and the general model ensemble.

8. The method of claim 1, wherein each general threat detection model is trained to calculate a rate of liveness.

9. A system for liveness detection, the system comprising:

an image capturing device for capturing an image or video for performing liveness detection thereon;

computing processor hardware;

software executable on the computing processor hardware that implements:

a threat detector configured to receive the image or the video, and one or more filters configured to perform a first level check for detecting a threat based on analysis of one or more characteristics on the image or the video received from the threat detector without detecting a classification or an identification of the threat, wherein on detecting the threat by the one or more filters, the threat detector registers a final threat verdict of the whole system;

one or more special models configured to perform a second level check on the image or the video, wherein the one or more special models are configured for detecting multiple types of threats on the image or the video, wherein each special model is trained to detect a predefined type of a threat, wherein the verdicts of all special models is passed to an aggregator model, wherein on detecting the threat by the aggregator, the threat detector registers the final threat verdict of the whole system;

a general model ensemble configured to perform a third level check on the image or the video, wherein the general model ensemble includes multiple general threat detection models configured to classify the image or the video according to individual features into original and fake, wherein the general model ensemble is trained to classify the image or video as live or not based on a verdict of each general threat detection model verdict, wherein on detecting the threat by the general model ensemble, the threat detector registers the final verdict of the whole system.

10. The system of claim 9, wherein the general model ensemble is configured to detect unknown threats, and wherein the general model ensemble includes the general threat detection models that are trained to be mostly uncorrelated.

11. The system of claim 10, wherein each of the multiple general threat detection models is configured to generate a verdict associated with a probability of the threat, wherein the final verdict of the threat is registered by the threat detector when the probability of the threat exceeds a threshold value.

12. The system of claim 9, wherein the one or more filters sequentially determines a verdict associated with a probability of the threat by each filter from an ordered list of filters, wherein the detecting of a threat is registered by the threat detector when the probability of the threat exceeds a threshold value for at least one of the filters.

13. The system of claim 12, wherein the threat detector is further configured to receive a verdict associated with a probability of the threat by each special model of one or more special models, wherein the final verdict of the threat is registered by the threat detector when the probability of the threat exceeds a threshold value.

14. The system of claim 13, wherein the one or more special models is further configured to receive input from the one or more filters as an input parameter for detecting the threat and a type of the threat by the one or more special models.

15. The system of claim 9, wherein the threat detector registers the final threat verdict of the whole system based on at least one of the final verdicts from the one or more filters, the one or more special models, and the general model ensemble.

16. The system of claim 9, wherein each general threat detection model is trained to calculate a rate of liveness.

17. A system for threat detection of an image, the system comprising:

computing processor hardware;

software executable on the computing processor hardware that implements a plurality of filters configured to determine a first verdict of the image when at least one of the plurality of filters detects an attack based on a probability specific to each of the plurality of filters;

a plurality of special models configured to, when the first verdict is not associated with an attack, determine a second verdict of the image when at least one of the special models detects an attack, wherein each of the plurality of special models is trained to detect a different type of threat;

a general model ensemble including a plurality of threat detection models arranged in an ensemble, and configured to, when the second verdict is not associated with an attack, determine a probability of attack specific to each of the plurality of threat detection models; and an aggregator configured to aggregate each of the probabilities of attack specific to each of the plurality of threat detection models to determine a third verdict.

18. The system of claim 17, further comprising a threat detector configured to receive at least one of the first verdict, the second verdict, or the third verdict and determine a threat.

19. The system of claim 18, wherein the general model ensemble is further configured to classify the image as an original image or a fake image.

20. The system of claim 17, wherein the a plurality of special models is applied sequentially after the plurality of filters and the general model ensemble is applied sequentially after the plurality of special models.

* * * * *